US 8,241,407 B2

(12) United States Patent
Yano et al.

(10) Patent No.: US 8,241,407 B2
(45) Date of Patent: Aug. 14, 2012

(54) ELECTROSTATICALLY ATOMIZING KIT FOR USE IN A VEHICLE

(75) Inventors: Takeshi Yano, Kyoto (JP); Shinjirou Seto, Hikone (JP)

(73) Assignee: Panasonic Corporation, Osaka (JP)

( * ) Notice: Subject to any disclaimer, the term of this patent is extended or adjusted under 35 U.S.C. 154(b) by 379 days.

(21) Appl. No.: 12/563,673

(22) Filed: Sep. 21, 2009

(65) Prior Publication Data

US 2010/0072310 A1 Mar. 25, 2010

(30) Foreign Application Priority Data

Sep. 25, 2008 (JP) ................. 2008-246950

(51) Int. Cl.
*B03C 3/014* (2006.01)
*B03C 3/68* (2006.01)
(52) U.S. Cl. ............. 96/19; 96/27; 96/53; 96/60; 96/97; 239/102.2; 261/DIG. 4
(58) Field of Classification Search ............... 96/18, 19, 96/27, 52, 53, 60, 62, 63, 97; 239/3, 102.1, 239/102.2, 697, 698; 261/78.2, 81, 116, 261/DIG. 3, DIG. 4, DIG. 15
See application file for complete search history.

(56) References Cited

U.S. PATENT DOCUMENTS

| | | | |
|---|---|---|---|
| 1,642,292 A | | 9/1927 | Becker |
| 3,807,137 A | * | 4/1974 | Romell ............................. 95/72 |
| 4,979,968 A | * | 12/1990 | Jido ................................. 96/27 |
| 5,595,587 A | * | 1/1997 | Steed ............................... 96/27 |
| 5,653,919 A | * | 8/1997 | White et al. ..................... 261/21 |
| 6,656,253 B2 | * | 12/2003 | Willey et al. ..................... 96/27 |
| 7,473,298 B2 | * | 1/2009 | Suda et al. ........................ 95/64 |
| 7,494,532 B2 | * | 2/2009 | Azukizawa et al. .............. 96/27 |
| 7,503,512 B2 | * | 3/2009 | Nakada et al. ............. 239/690.1 |
| 7,854,403 B2 | * | 12/2010 | Yano et al. ..................... 239/700 |
| 7,959,717 B2 | * | 6/2011 | Yano et al. ........................ 96/27 |
| 2004/0113468 A1 | | 6/2004 | Swanson et al. |

FOREIGN PATENT DOCUMENTS

| | | |
|---|---|---|
| CN | 1174788 A | 3/1998 |
| CN | 1876417 A | 12/2006 |
| JP | 6-727 10 U | 10/1994 |
| JP | 8-156581 A | 6/1996 |
| JP | 2006-151046 A | 6/2006 |
| JP | 2008-37247 A | 2/2008 |
| JP | 2008-207632 A | 9/2008 |
| WO | WO-2006/131049 A1 | 12/2006 |
| WO | WO-2008/016180 A1 | 2/2008 |

OTHER PUBLICATIONS

The First Office Action for the Application No. 200910177751.X from The State Intellectual Property Office of People's Republic of China dated Dec. 29, 2010. Extended European Search Report for the Application No. EP 09 01 2032 dated Jan. 4, 2010.
Japanese Notification of Reasons for Refusal for the Application No. 2008-246950 from Japan Patent Office dated Apr. 17, 2012.

* cited by examiner

*Primary Examiner* — Richard L Chiesa
(74) *Attorney, Agent, or Firm* — Cheng Law Group, PLLC

(57) ABSTRACT

An electrostatically atomizing kit for use in a vehicle has an atomizing unit in combination with a plurality of differently shaped deflector guides. The atomizing unit is supplied with water and electrostatically atomizing the water into charged minute water particles in the form of a mist to be carried on a conditioned air blowing into a passenger's room through a blow port. The deflector ducts are selectively detachable to the blow port, and are differently shaped to each other to deflect the conditioned air carrying the mist in different directions in order to effectively concentrate the mist carried air to a particular object or item in the passenger's room.

5 Claims, 6 Drawing Sheets

ELECTROSTATICALLY ATOMIZING KIT FOR USE IN A VEHICLE

FIELD OF THE INVENTION

The present invention relates to an electrostatically atomizing kit for use in a vehicle, and more particularly to a kit for providing a system of discharging a mist of charged minute water particles into a passenger's room of a vehicle as being carried on a conditioned air for effectively concentrating the mist on a particular object in the passenger's room.

BACKGROUND ART

WO 2008/016180 A1 discloses an air conditioning device for a vehicle which is designed to supply a mist of charged minute water particles into a passenger's room as being carried on a conditioned air generated by an air conditioning system of the vehicle. The device includes an atomizing unit with an emitter electrode which is cooled to condense the water from within the surrounding air, and a high voltage source applying a high voltage to the emitter electrode for electrostatically atomizing the water into charged minute water particles in the form of a mist. The atomizing unit is disposed to carry the mist on the conditioned air flowing into the passenger's room through a blow port disposed, for example, in an instrument panel of the vehicle. Such mist is known to contain radicals which remain over a long period of time when diffused in a large amount and react effectively with offensive odors for deodorizing the passenger's room and/or deactivating allergens introduced in the room. Especially, the mist is expected to deodorize a particular object such as shoes and clothing of the passenger and deactivate the allergens adhered thereto. However, the blow port in the instrument panel is normally designed to direct the conditioned air to the passenger's face or the body, and is not sufficient to concentrate the mist carrying conditioned air to the shoes, the clothing taken off the passenger, or an umbrella with water droplets of unpleasant odor. Accordingly, it has been demanded to concentrate the mist carrying conditioned air to a particular kind of the object in an effective manner depending upon the kind of the object.

SUMMARY OF THE INVENTION

In view of the above problem, the present invention has been achieved to provide an electrostatically atomizing kit for use in a vehicle which is capable of effectively concentrating the mist carrying conditioned air in an effective manner depending upon the kind of the object to deodorize the object and/or deactivate allergens adhered to the object. The electrostatically atomizing kit in accordance with the present invention is adapted in use with the vehicle equipped with an air conditioning system having a ventilation duct configured to blow a conditioned air into a passenger's room through a blow port. The kit includes an atomizing unit having an emitter electrode, a water-supply means for supplying water to the emitter electrode, a high voltage source, and a discharge port. The high voltage source is provided to apply a high voltage to the water on the emitter electrode so as to electrostatically atomize the water into charged minute water particles in the form of a mist, which is discharged out through the discharge port. A mist feeding duct extends from the discharge port and is coupled to the ventilation duct upstream of the blow port so as to carry the mist on the conditioned air flowing through the ventilation duct, thereby producing a mist carrying conditioned air blowing out through the blow port. The kit includes a plurality of deflector ducts selectively detachable to the blow port. The deflector ducts are differently shaped to each other to deflect the mist carrying conditioned air in different directions. With this arrangement, it is possible to concentrate the mist carrying conditioned air to a desired local spot for deodorization of the object and/or deactivation of the allergens adhered to the object in an effective manner depending upon the location of the object.

Preferably, the kit includes a controller that provides different modes of blowing the conditioned air into the passenger's room at different values of parameter, and a selector configured to select one of the different modes. The parameter is selected from at least one of a blowing rate, temperature and humidity of the conditioned air. Accordingly, the mist carrying conditioned air can be regulated at an optimum state for effective deodorization of the object and/or deactivation of the allergens.

Further, each of the deflector ducts may be provided at its downstream end with a louver for varying the direction of the mist carrying conditioned air directed to the passenger's room. With the provision of the louver, it is possible to make a precise adjustment for deflecting the mist carrying conditioned air to the object.

These and still other objects and advantageous features of the present invention will become more apparent from the following detailed description when taken in conjunction with the attached drawings.

BEST MODE FOR CARRYING OUT THE INVENTION

Figure 1:
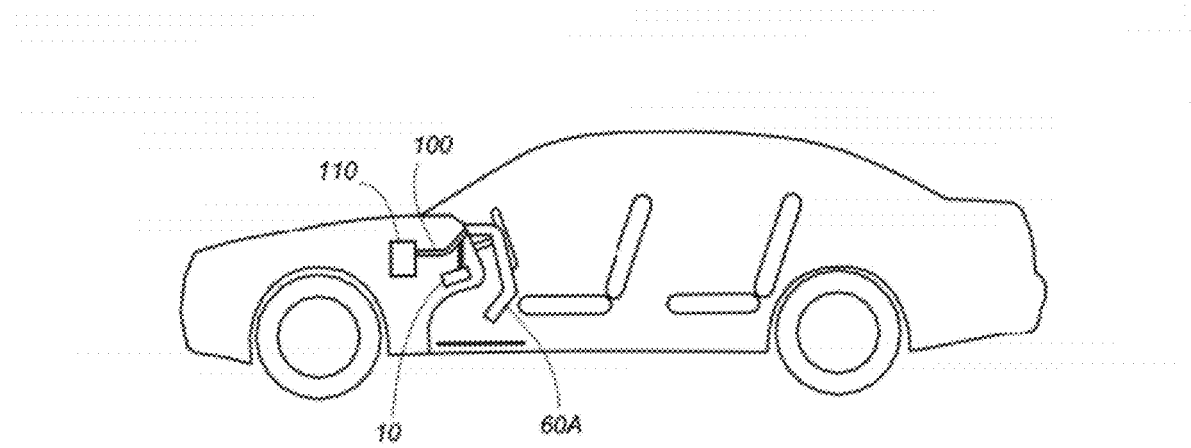
FIG. 1 is a schematic view illustrating an electrostatically atomizing kit for use in a vehicle in accordance with a preferred embodiment of the present invention.
Figure 2:
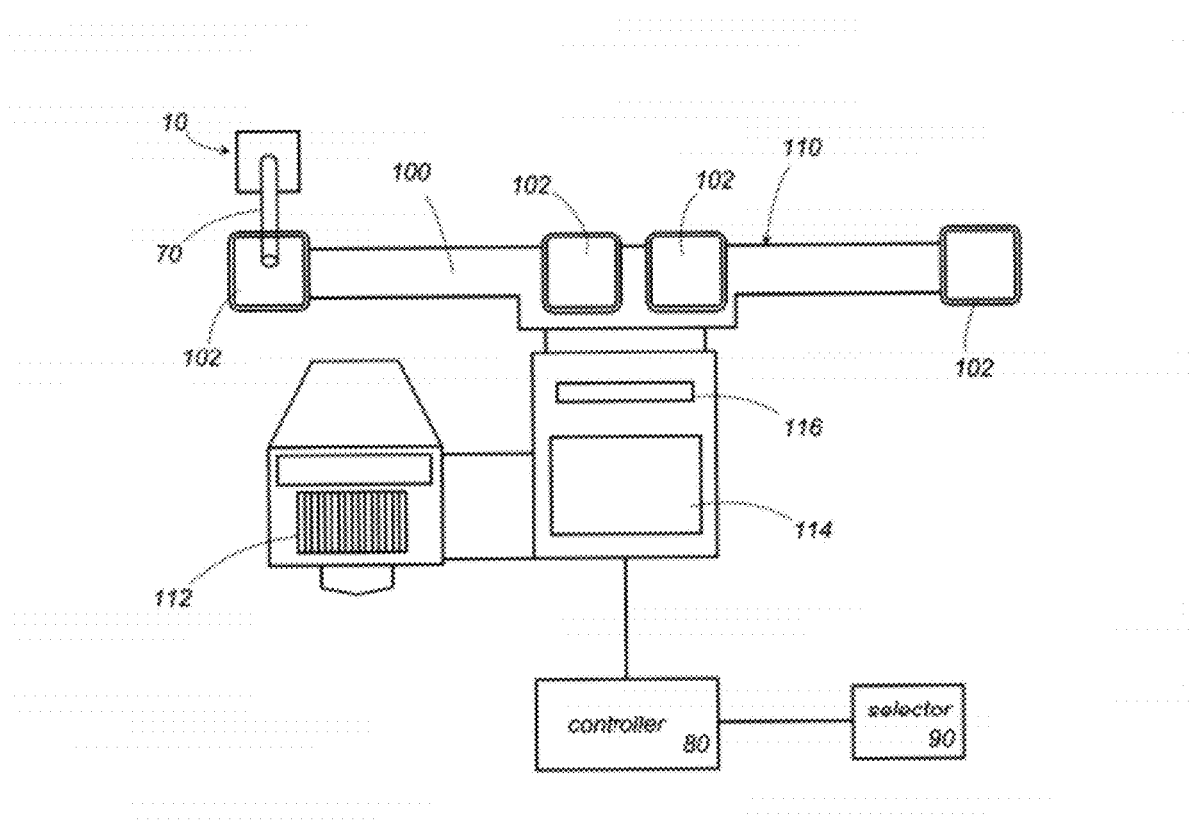
FIG. 2 is schematic view illustrating an atomizing unit added to an air conditioning system of the vehicle for supplying a mist of charged minute water particles.

Referring now to FIGS. 1 and 2, there is shown an electrostatically atomizing kit for use in a vehicle in accordance with the present invention. The kit is adapted to the vehicle equipped with an air conditioning system 110 having a ventilation duct 100, a blower 112 drawing in an outside fresh air or a room air into the ventilation duct 100, and a combination of a heat exchanger 114 and a heater 116 disposed downstream of the blower 112 to generate a conditioned air to be blown through the ventilation duct 100 into the passenger's room through a plurality of blow ports 102 located in the passenger's room.

Figure 3:
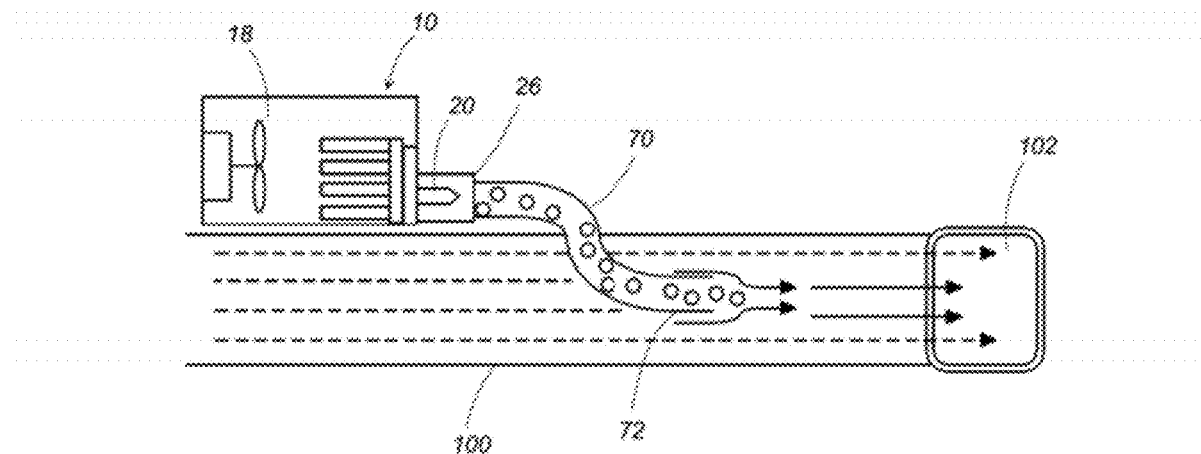
FIG. 3 is a schematic view illustrating a mist feeding duct for feeding the mist to a ventilation duct of the air conditioning system.

The kit includes an atomizing unit 10, a mist feeding duct 70, and a plurality of deflector ducts 60A, 60B, and 60C. The atomizing unit 10 is configured to take water from the surrounding air by condensation, and electrostatically atomize it into charged minute water particles to generate a mist of the particles which is discharged out of the atomizing unit 10 and is fed into the ventilation duct 100 by way of the mist feeding duct 70, as shown in FIG. 3, whereby the mist carrying conditioned air is blown out into the passenger's room through one of the blow ports 102. As discussed later, the deflector ducts 60A, 60B, and 60C are provided to be detachable to the one blow port 102 in order to deflect the mist carrying conditioned air in predetermined directions.

Figure 4:
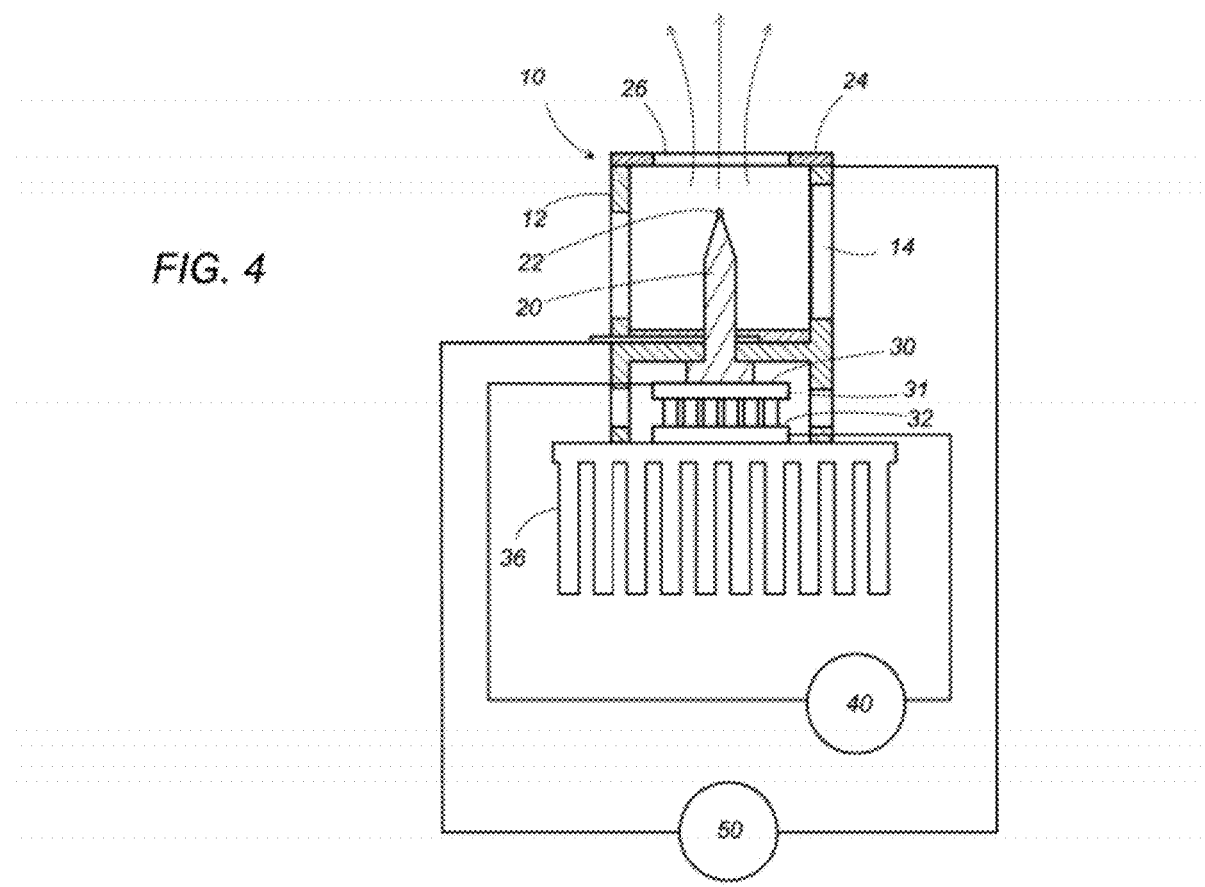
FIG. 4 is a sectional view of the atomizing unit employed in the above kit to generate the mist.
Figure 5:
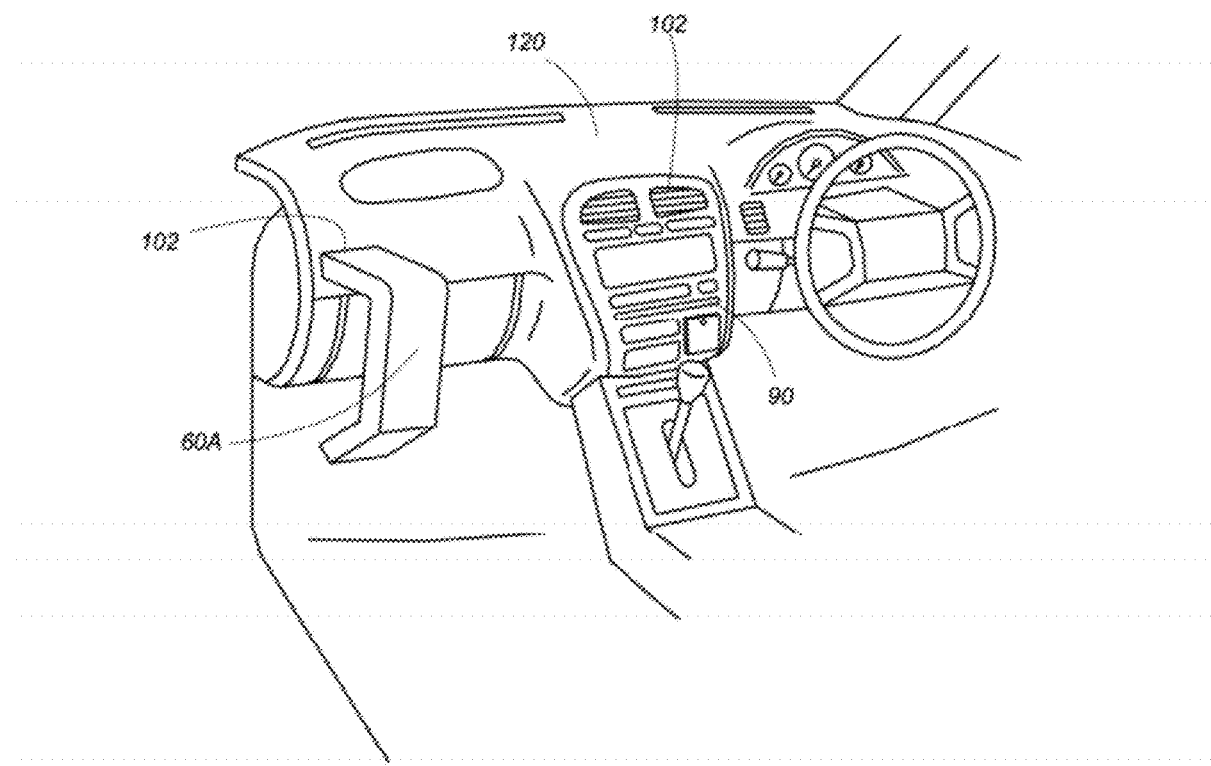
FIG. 5 is a perspective view illustrating a deflector duct employed in the above kit to be attached to a blow port in an instrument panel of the vehicle.
Figure 6:
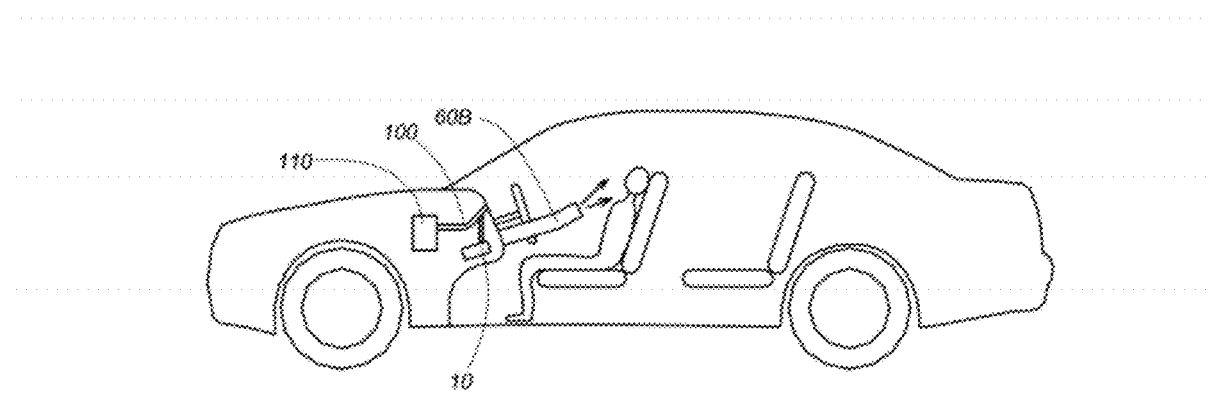
FIG. 6 is a schematic view illustrating the use of another deflector duct.
Figure 7:
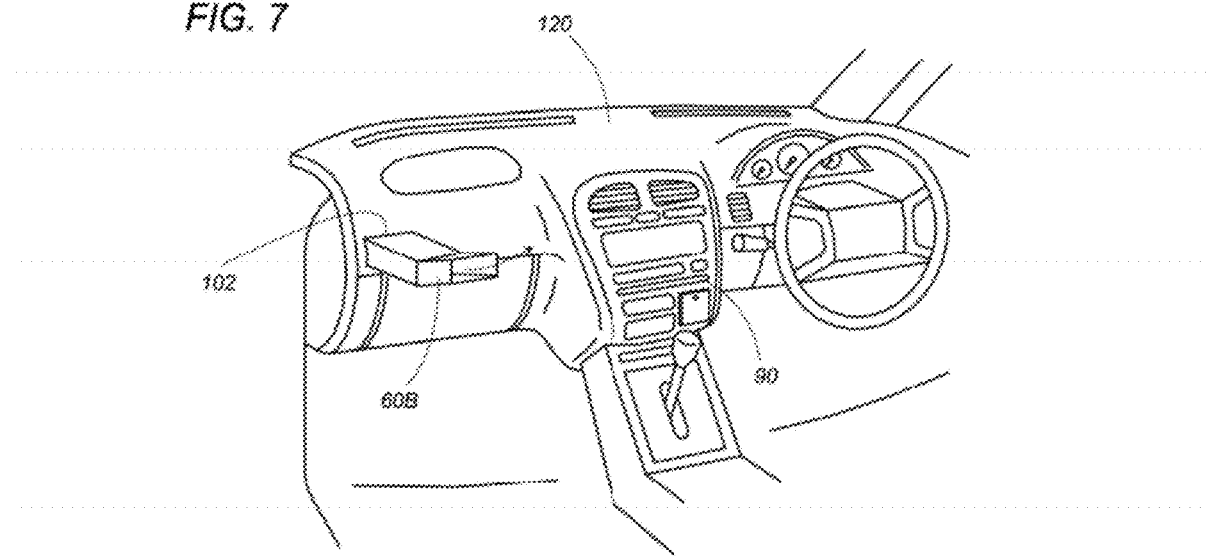
FIG. 7 is a perspective view illustrating the deflector duct employed in the instance of FIG. 6.
Figure 8:
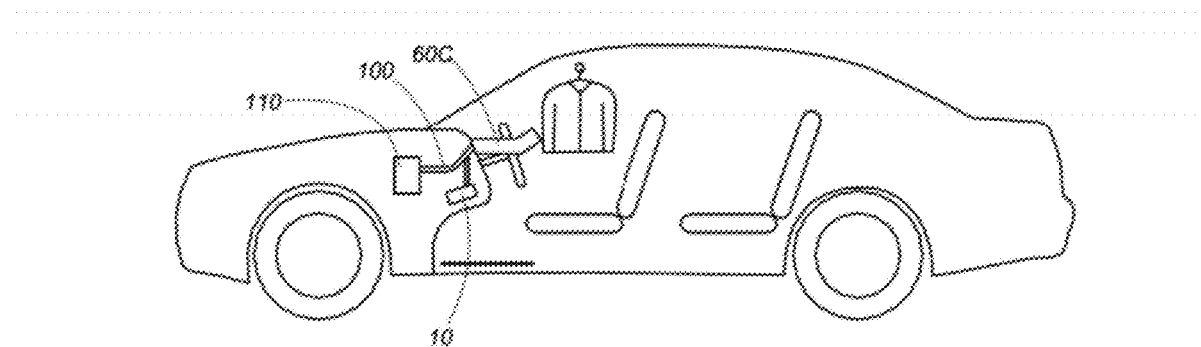
FIG. 8 is a schematic view illustrating the use of a further deflector duct.
Figure 9:
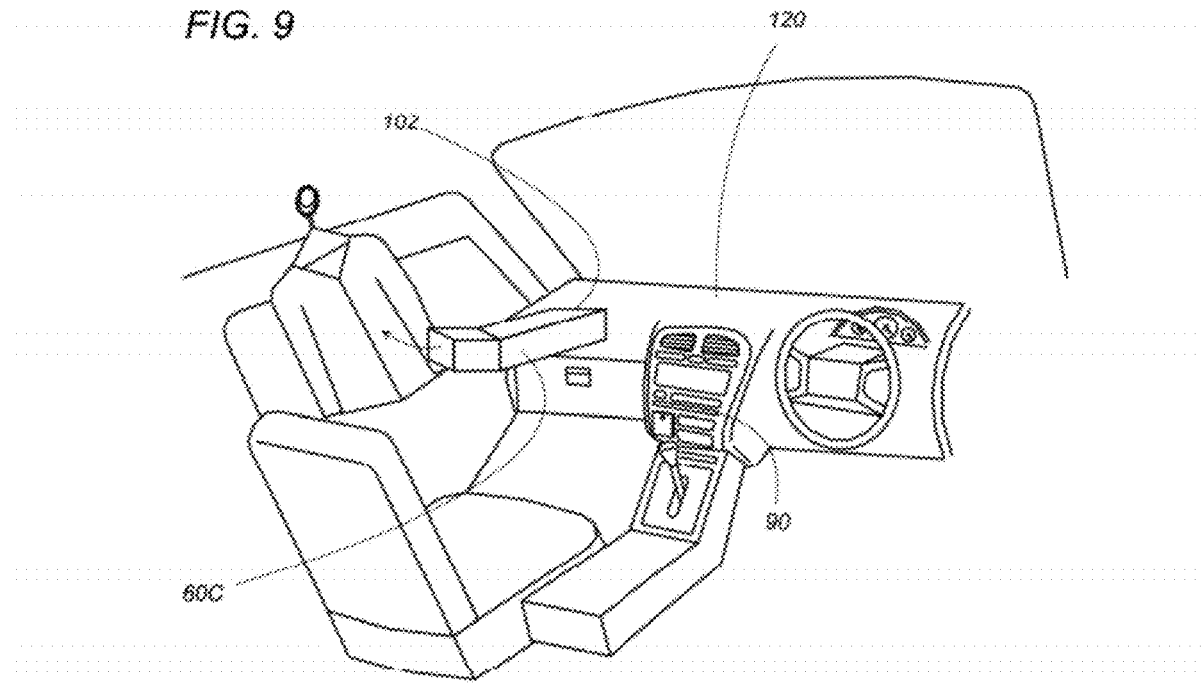
FIG. 9 is a perspective view illustrating the deflector duct employed in the instance of FIG. 8.
Figure 10:
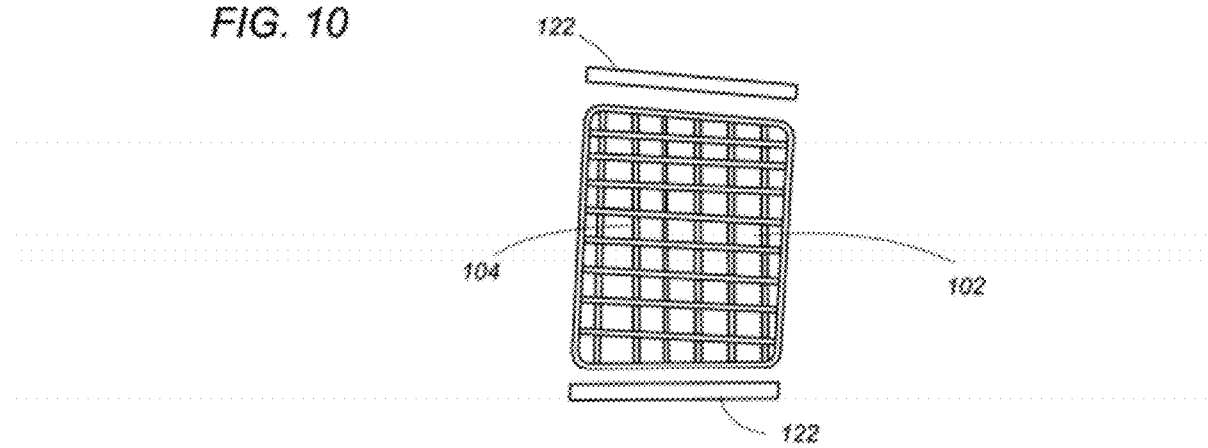
FIG. 10 is a front view of the blow port.
Figure 11:
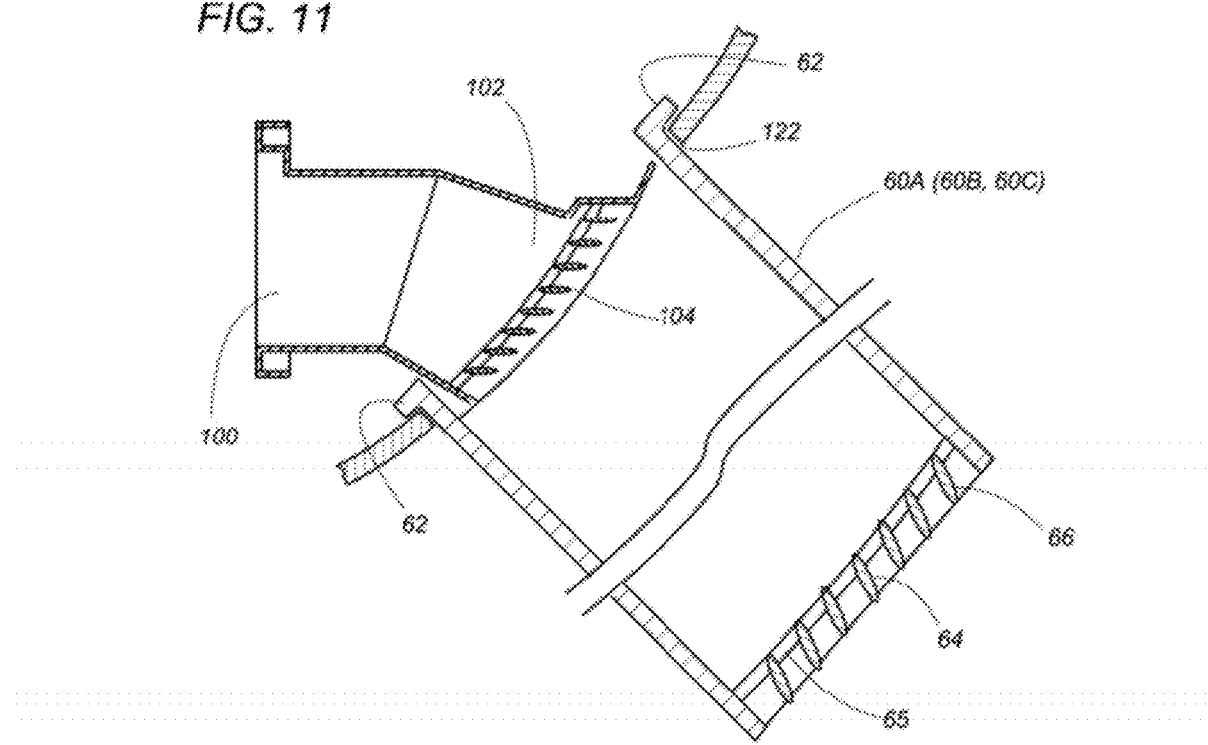
FIG. 11 is a sectional view of a connection of the deflector duct to the blow port.

As shown in FIG. 4, the atomizing unit 10 includes a cylindrical barrel 12 carrying an emitter electrode 20 projecting through a bottom of the barrel 12, and an opposed electrode 24 which is disposed in an opposite relation to the emitter electrode 20. The oppose electrode 24 is shaped from an electrically conductive substrate with a circular opening 26 which has an inner periphery spaced by a predetermined distance from a discharge end 22 at the tip of the emitter electrode 20 to define a discharge port of discharging the mist. The atomizing unit 10 includes cooling means 30 and a high voltage source 50. The cooling means 30 is coupled to cool the emitter electrode 20 in order to condense the water content carried in the surrounding air on the emitter electrode 20, thereby supplying the water thereto. The high voltage source 50 is provided to apply a high voltage across the emitter electrode 20 and the opposed electrode 24 so as to charge the water on the emitter electrode 20 and atomize it into the charged minute water particles to be discharged out through the discharge port 26 in the form of the mist. The cooling means 30 is realized by a Peltier module having a cooling side coupled to the emitter electrode 20 at its one end away from the discharge end 24, and having thermo-electric elements which, upon being applied with a predetermined voltage, cools the emitter electrode to a temperature below a dew point of the water. The Peltier module has a plurality of thermo-electric elements arranged in parallel with each between thermal conductors 31 and 32 to cool the emitter electrode 20 at a cooling rate determined by a variable voltage given from a cooling electric source circuit 40. One thermal conductor 31 defining the cooling side is coupled to the emitter electrode 20, while the other thermal conductor 32 defining the heat radiation side is provided with a heat radiator 36. The Peltier module is fixed between the bottom of the barrel 12 and the heat radiator 36 with its cooling side conductor 31 in heat transfer contact with a root of the emitter electrode 20. The high voltage source 50 includes a high voltage generation circuit which applies a predetermined high voltage across the emitter electrode 20 and the grounded opposed electrode 20 to give a negative or positive voltage (for example, −4.6 kV) to the emitter electrode 20, thereby generating the mist of the charged minute water particles of nanometer size. The resulting mist includes radicals effective for removing unpleasant odor from the object and/or deactivating allergens adhered to the object. The atomizing unit 10 is mounted behind an instrument panel 120 with its opening 14 in the side wall of the barrel connected to take the room air for condensation of the water contained in the air at the emitter electrode 20.

The mist feeding duct 70 extends behind the instrument panel 120 from the discharge port 26 of the atomizing unit 10 and has a coupling end 72 which is configured to be coupled to the ventilation duct 100 immediately upstream of one of the blow ports 102 in order to feed the mist to the conditioned air flowing through the ventilation duct 100 so that the mist is discharged out through the blow port 102 into the passenger's room as being carried on the conditioned air flow. The mist feeding duct 70 is shaped to have its coupling end bent along the ventilation duct 100 for guiding the mist along the flow of the conditioned air. Preferably, the duct 70 is made flexible for easy connection to the ventilation duct 100. As shown in FIG. 3, the atomizing unit 10 includes a fan 18 which generates a forced air flow of supplying the room air to the emitter electrode 20 for condensation thereat and also of feeding the mist into the ventilation duct 100 through the mist feeding duct 70 into the ventilation duct 100. In this connection, a controller 80 is included in the kit to regulate the fan 18 to vary the flow rate of the mist being flown into the ventilation duct in accordance with the flow rate of the conditioned air flowing through the ventilation duct 100. For this purpose, the controller 60 is connected to receive a signal from a speed monitor (not shown) that monitors a rotating speed of the blower 112 included in the air-conditioning system 110 to flow the conditioned air through the ventilation duct 100, and is configured to drive the fan 18 for flowing the mist out through the mist feeding duct 70 at a flow rate in match with the flow rate of the conditioned air, facilitating to carry the mist on the conditioned air for successfully spreading the mist into the passenger's room.

The deflector ducts 60A, 60B, and 60C are each configured to be detachable to the blow port 102, e.g., at the left end of the instrument panel 120 adjacent to a navigator's seat, and are differently shaped or bent to deflect the mist carrying conditioned air in directions different from each other. FIG. 5 illustrates one particular kind of the deflector duct 60A which is U-shaped to the mist carrying conditioned air (hereinafter sometimes refer to simply as "mist carrying air") toward the floor below the instrument panel 120. Although not shown in FIG. 5, the deflector duct 60A is formed at its one end with a pair of hooks detachable engaged with a corresponding pair of notches around the blow port. With the selective use of the deflector duct 60A, the mist carrying air is guided in a concentric manner towards the shoes of the passengers or the like object positioned on the floor below the instrument panel 120 for deodorization of the object and/or the deactivation of allergens adhered thereto.

FIGS. 6 and 7 illustrate the use of another deflector duct 60B which is shaped to deflect the mist carrying air towards the passenger's head for facilitating the deodorization of the hairs while adding humidity to the hairs.

FIGS. 8 and 9 illustrate the use of a further deflector duct 60C which is shaped to deflect the mist carrying air laterally and upwardly towards a side window on the side of a navigator seat for deodorization of a jacket or the like clothing suspended from an inside roof along the side window and/or deactivation of allergens adhered thereto.

The deflector ducts are not limited to the above shapes and may include further one of differently shape or configuration, for example, a deflector duct shaped to deflect the mist carrying air downward and sideward for deodorization of a wet umbrella put on the floor adjacent to a passenger's door. Further, it is possible to include a deflector duct in the form of a flexible bellows capable of varying a direction of deflecting the mist carrying air.

As shown in FIGS. 10 and 11, each of the deflector ducts 60A, 60B, and 60C is formed at its one lengthwise end with a pair of hooks 62 for detachable engagement into a corresponding pair of notches 122 on opposite sides of the blow port 102. Thus, the deflector duct can be easily attached to and detached from a portion of the instrument panel around the blow port 102. Further, the deflector duct is provided at its distal lengthwise end with a louver 64 having a like configuration of a louver 104 provided in the opening of the blow port 102, namely, being composed of an array of vertical slats 65 and horizontal slats 66.

The controller 80 is adapted in use to be electrically connected to an electrical circuitry of the air conditioning system 110 for controlling the blower 112, the heat exchanger, and the heater 116 in order to provide different modes of blowing the mist carrying air into the passenger's room at different parameters including a blowing rate, temperature, and humidity. The modes include a first mode, a second mode, and a third mode which are associated respectively with the use of the deflector ducts 60A, 60B, and 60C, and are configured to blow the mist carrying air in optimum conditions for the deodorization and/or the deactivation of allergens. The selection of the modes is made at a selector 90 which is arranged on the instrument panel 120 to be accessible by the passengers.

Although the above embodiment illustrates that the mist generated at the atomization unit 10 is flown out through only one of the blow ports 102, the present invention should not be limited to this particular embodiment, and may encompass a modification where the mist is fed to the ventilation duct 100 at a plurality of points respectively immediately behind the individual blow ports 120 by use of the mist feeding duct having a manifold coupling for connection with the plural points of the ventilation duct.

Further, in the above illustrated embodiment, the atomizing unit 10 is configured to include the opposed electrode 24 in front of the emitter electrode 20. It should be noted that the opposed electrode 24 is only preferable for controlling a flow direction of the mist, but is not an essential element for generating the mist. For example, the high voltage may be alternatively applied to the emitter electrode 20 as being grounded to a part of the mist feeding duct 70, the room air intake duct 80, the ventilation duct 100, fixture housing 18, or any other surrounding object.

In addition, the atomizing unit 10 may be configured to include a water supply tank for feeding the water to the emitter electrode 20 by use of a capillary effect, instead of the cooling means 30.

The invention claimed is:

1. An electrostatically atomizing kit for use in a vehicle equipped with an air conditioning system having a ventilation duct blowing a conditioned air into a passenger's room through a blow port, said kit comprising:
    an atomizing unit having an emitter electrode, a water-supply means for supplying water to said emitter electrode, a high voltage source, and a discharge port, said high voltage source applying a high voltage to said emitter electrode so as to electrostatically atomize the water on the emitter electrode into charged minute water particles in the form of a mist, which is discharged out through said discharge port;
    a mist feeding duct extending from said discharge port of the unit and being coupled to said ventilation duct upstream of said blow port so as to carry the mist on the conditioned air flowing through said ventilation duct, thereby producing a mist carrying conditioned air blown through said blow port; and
    a plurality of deflector ducts selectively detachable to said blow port, said deflector ducts being differently shaped to each other to deflect the conditioned air carrying said mist in different directions,
    wherein said plurality of deflector ducts comprise at least two deflector ducts of a deflector duct which is U-shaped to deflect the conditioned air toward the floor in said passenger's room, a deflector duct which is shaped upwardly to deflect the conditioned air toward the passenger's head, and a deflector duct which is shaped laterally and upwardly to deflect the conditioned air towards a side window in said passenger's room.

2. The electrostatically atomizing kit as set forth in claim 1, further including
    a controller configured to provide different modes of blowing the mist carrying conditioned air into the passenger's room at different parameters, said parameter being selected from at least one of a blowing rate, temperature and humidity of said conditioned air, and
    a selector configured to select one of said different modes.

3. The electrostatically atomizing kit as set forth in claim 1, wherein
    each of said deflector ducts is provided at its downstream end with a louver for varying the direction of the mist carrying conditioned air directed to the passenger's room.

4. The electrostatically atomizing kit as set forth in claim 2, wherein
    each of said deflector ducts is provided at its downstream end with a louver for varying the direction of the mist carrying conditioned air directed to the passenger's room.

5. The electrostatically atomizing kit as set forth in claim 1, wherein each of said plurality of deflector ducts is formed of material which is undeformable when used.

\* \* \* \* \*